United States Patent Office 3,109,497
Patented Nov. 5, 1963

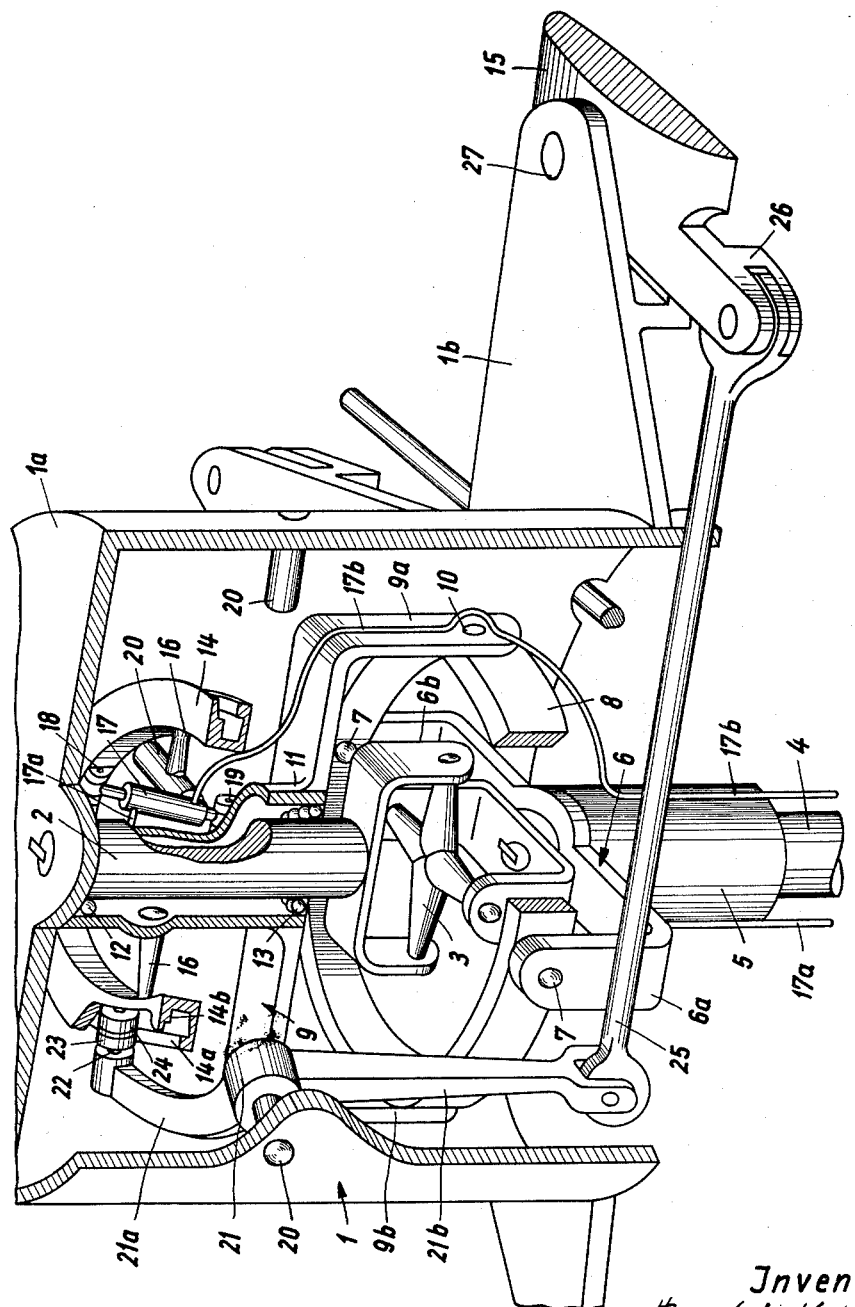

3,109,497
ROTARY WING AIRCRAFT ROTOR
CONSTRUCTIONS
Hans Schekulin, Bremen, Germany, assignor to Bölkow-Entwicklungen Kommanditgesellschaft, Ottobrunn, near Munich, Germany
Filed July 25, 1961, Ser. No. 126,692
Claims priority, application Germany July 28, 1960
5 Claims. (Cl. 170—160.26)

This invention relates in general to rotary wing aircraft rotor constructions and in particular to a new and useful rotor and transmission system for the controlled rotative movement of the blades of such craft.

The present invention is an improvement over that disclosed and claimed in copending application, Serial No. 125,784, filed July 21, 1961, by Hans Derschmidt and Gerhard Eck, particularly in respect to a rotor head construction which carries a transmission control mechanism for pivoting the blades of the aircraft rotor to accelerate or retard these blades during the overall rotative movement thereof for the purpose of producing the most desirable motion characteristics.

As described in the copending application, the transmission means advantageously includes means for periodically varying the rotary speeds of the blades to impart a decreased rotary speed to the blades as they are moved to a leading position in front of the aircraft and to impart an increased rotary speed to the blades as they are moved to a position at the trailing portion of the aircraft. The change in rotary speeds of the blades is produced by pivoting the blades about their mounting on a central rotor head by means of a transmission mechanism which advantageously causes the overall rotation of the blades to approach a simple harmonic motion.

The present invention is an improvement over the copending application, particularly in respect to the simple construction of rotor head and supporting means for the transmission mechanism. The rotor head and the transmission occupy a minimum of space and are of very low weight. The transmission mechanism is mounted within the rotor in a manner which insures that it will not be subjected to any disturbing movement influences or impact movements of the rotor head itself.

In accordance with the invention, a central cylindrical rotor head is provided with angularly spaced extending portions upon which are pivotally mounted the inner ends of the rotor blades. The cylindrical rotor head is connected through a universal joint to the main rotor drive shaft of the craft. A control swash plate for the transmission is pivotally mounted within the rotor head and provides a control surface for actuating lever rod members for effecting the controlled rotation of the rotor blades to achieve the desired harmonic motion thereof. The swash plate is supported on a universal joint independent of the rotor head so that tilting movement of the rotor head does not effect any change in the controlled rotational movement of the rotor blades.

The swash plate for controlling the movement of the crank arms for effecting the advance and retard of rotation of the rotor blades is mounted concentrically with the rotor shaft and connected through a universal joint to a stationary portion of the aircraft. The compact arrangement of the control mechanism for transmitting the correct rotational movement to the rotor blades permits a rotor head construction of smaller height so that the transmission and rotor head may be used on a larger variety of rotary wing aircraft. This advantage is achieved due to the fact that the rotor with the swash plate and the means for transmitting the oscillating movement of the swash plate to the rotor blades, which means are on the interior space of the rotor head, form a compact constructional unit which is self-contained and which may be arranged in a simple manner on each desired airplane portion of the aircraft. In addition, by means of the inventive arrangement of the swash plate, the diameter of the rotor head may be made smaller so that a favorable extension or prolongation of the rotor blades is obtained to favorably influence the driving capacity of the rotor blades.

Accordingly, an object of this invention is to provide an improved rotor head construction for an aircraft.

A further object of the invention is to provide a rotary wing aircraft having a central shaft driving a cylindrical rotor head through a universal joint, a control swash plate pivotally mounted within the head and a crank arm member pivotal on a portion of the head and guided by the swash plate connected to each of the rotor blades for effecting the controlled rotation thereof.

It is a further object of this invention to provide a rotary wing aircraft rotor head construction including a central hollow cylindrical member carrying the rotor blades, which are pivotally mounted thereon; the central cylindrical member being driven by a rotating main shaft of the craft driving through a universal joint, and further including a transmission mechanism mounted within the rotor head independent of pivotal movement thereof and connected to the blades of the craft for increasing and decreasing the rotative velocity thereof during its overall cycle of rotation.

A further object of the invention is to provide a rotor construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

The only FIGURE in the drawing is a fragmentary perspective view partly broken away of a rotor head constructed in accordance with the invention.

Referring to the drawing in particular, there is indicated a cylindrical rotor head generally designated 1 having a closed top or end surface 1a. A shaft 2 is rigidly connected at its upper end to the cover plate 1a and it is rotated through a universal joint 3 by means of a rotor shaft 4. A supporting pipe 5 is concentrically mounted around the shaft 4 and is rigidly connected to a frame portion (not shown) of a rotary wing aircraft, the shaft 4 being rotatable therein.

A yoke or stirrup generally designated 6 is secured to the upper end of the stationary supporting pipe 5. A universal ring 8 is pivotally supported at diametrically opposite locations by pins 7 secured to arm portions 6a and 6b of the stirrup 6. A second inverted yoke or stirrup generally designated 9 is formed at the lower end of a hollow, cylindrical sleeve member 11 and includes arms 9a and 9b which extend downwardly and are pivotally connected to the universal ring 8 by means of pins 10 at diametrically opposite locations and 90° offset from the locations of the pins 7, 7. The parts including the yoke 6, the universal ring 8 and the yoke 9 form a universal joint similar to the universal joint 3.

The shaft 2 is rotatable in the sleeve 11 by means of the bearings 12 and 13. Thus the sleeve 11 is not influenced by rotation of the shaft 2.

In accordance with one aspect of the invention, the first universal joint 3 and the second universal joint formed by the parts 6, 8 and 9 are arranged relative to each other in such a manner that both joints have a common center point. The universal joint 3 is concentrically surrounded by the joint consisting of the parts 6, 8 and 9.

In accordance with a further aspect of the invention, a control or swash plate 14 having upper and lower control surfaces 14b and 14a is pivotally mounted on diametrically opposite supporting pins 16 secured to the sleeve 11. The swash plate 14 is provided for controlling the superimposed rotative movement of rotor blades 15 which are pivotally mounted on an extension 1b at the lower portion of the rotor head 1 on pivot pins 27. The swash plate 14 is arranged concentric to the rotor shaft 4. For clarity of illustration purposes, only one blade 15 and its associated transmission mechanism are indicated.

In the embodiment shown, pivotal movement of the swash plate 14 about its pivotal axis on the pins 16 is controlled by means of a hydraulic cylinder and piston assembly generally designated 17, which includes piston rod extensions which are pivotally connected at 18 to the swash plate and at 19 to the sleeve 11. The cylinder of the hydraulic piston and cylinder assembly 17 is connected via pressure lines 17a and 17b to a hydraulic control cylinder (not shown) for effecting pivotal movement of the swash plate as desired. When the piston rod portion of the cylinder and piston head combination 17 is extended, the inclination of the plate relative to its axis, which is perpendicular to the shaft 2, is increased.

In some instances the hydraulic piston and cylinder combination 17 is replaced by either a direct or an indirect mechanical or electrical actuator of known construction (not shown) to effect the adjustable movement.

At radially spaced locations at the interior of the rotor head 1, there are provided a number of pins 20 corresponding in number to the number of rotor blades, which form pivotal supports for individual crank arm lever members generally designated 21, provided for each of the rotor blades 15. The crank arm lever members include an arm 21a carrying a pin 22 at its outer end which rotatably carries conically shaped rollers 23 and 24. The roller 23 bears against the lower control surface 14a and the roller 24 bears against the upper control surface 14b of the swash plate 14. In this manner, the arm 21a is held in locked operative engagement with the swash plate to cause a rocking motion of the double armed lever when the rotor head 1 is rotated relatively to the swash plate. This rocking motion causes an arm portion 21b to articulate a connecting rod 25 which is connected to a lever extension 26 of the associated rotor blade 15.

The operation of the device is as follows: The rotor head is rotated when the rotor shaft 4 is rotated, driving through the universal joint 3 and the shaft 2. Rotation of the rotor head causes oscillation of the double armed lever 21 as the rollers 23 and 24 are moved by the head rotation along the surfaces 14a and 14b.

The rotary movement of the lever arm 21 is transmitted to the associated rotor blade 15 via the arm 21b, the connecting rod 25 and the lever arm 26. The swash plate 14 is held in position and does not move relative to the frame of the aircraft by means of the outer universal joint which consists of the parts 6, 8 and 9. When the rotor head 1, with its shaft 2, is given another direction of movement than the rotor shaft 4, as would be the case upon impact movements or semi-rigid rotors, then the swash plate 14 is not disturbed or inclined relative to the rotor head 1. Therefore, the inventive arrangement of the swash plate provides the important advantage that the rotary movement is not influenced by the impact movement of the entire rotor.

A further advantage of the arrangement is that the transmission for obtaining the rotary movement of the blades 15 is situated predominantly above the universal joint 3 for the connection of the rotor. This permits great saving in space, which space may provide, for example, a location for the arrangement of a control system for adjusting the adjusting angles of the rotor blades. In addition, when the rotor head is constructed as indicated herein, the main drive for the drive shaft 4 can be placed in an advantageous manner closely adjacent to the rotor head 1.

Independent of the actual construction of the invention, the advantages mentioned will always be obtained, that is, it will always have low weight, little space, be reliable and technically simple. Moreover, a rotary aircraft constructed in this manner will have very little end face resistance in forward flying.

While a specific embodiment of the invention has been shown and described in detail to illustrate the application of the inventive principles, it will be understood that the invention may be embodied otherwise without departing from such principles.

What is claimed is:

1. A rotary wing aircraft of a type wherein the angularity of the rotor blades is varied in respect to an axis substantially parallel to the axis of their associated rotor head during rotation of the head comprising a main rotor shaft, a hollow rotor head, a plurality of rotor blades pivotally connected adjacent their inner ends to said rotor head, first universal joint means including a joint portion connecting said main rotor shaft and a shaft extension portion connecting the interior of said rotor head effecting rotation of said rotor head and permitting pivotal movement thereof in respect to said main rotor shaft, a member surrounding said shaft extension portion, a control plate for controlling the rotation of said rotor blades about their pivotal connection pivotally mounted on said member within said head concentrically in respect to said rotor shaft, second universal joint means supporting said member independently of pivotal movement of said rotor head, relative to said main rotor shaft and means carried by said head and having a portion in guiding contact with said control plate and movable upon rotation of said head, said means being connected to each of said blades to rotate said blades about their pivotal connection on rotary movement of said head.

2. A rotary wing aircraft comprising a main rotor shaft, a stationary supporting pipe extending around said main rotor shaft, a hollow control plate supporting sleeve, a first universal joint arranged below and connecting said supporting sleeve and arranged above and connecting said stationary supporting pipe, a hollow rotor head covering said first universal joint and said supporting sleeve, a plurality of rotor blades pivotally connected adjacent their inner ends to said rotor head for rotation with said rotor head and for pivotal lead and lag movement about an axis substantially parallel to the axis of said rotor head, a second universal joint connecting said rotor shaft and the interior of said rotor head, a control plate pivotally mounted on said hollow sleeve and extending concentrically therearound, and blade pivoting means including individual crank members for each blade pivotally mounted at angularly spaced locations on the interior of said rotor head and having a portion in guiding contact with said control plate and connected to said blades to rotate said blades about their pivotal connection upon rotation of said rotor head.

3. A rotary wing aircraft according to claim 2, wherein said second universal joint includes a shaft extension connected to the interior of said rotor head and disposed within said hollow sleeve.

4. A rotary wing aircraft comprising a main rotor shaft, a hollow rotor head, a plurality of blades pivotally connected adjacent their inner ends to said rotor head for rotation with said head and for pivotal lead and lag movement about an axis substantially parallel to the axis of said rotor head, first universal joint means including a joint portion connecting said main rotor shaft and a shaft extension portion above said joint portion connecting the interior of said rotor head to effect rotation of said rotor head and to permit pivotal movement thereof in respect to said main rotor shaft, a sleeve member surrounding said shaft extension portion, a control plate pivotally mounted on said sleeve member within said head, second universal joint means supporting said sleeve member independently of pivotal movement of said rotor head relative to said main rotor shaft, and blade rotating means including individual crank members for each blade pivotally mounted at angularly spaced locations on the interior of said rotor head, having a first arm portion in guiding contact with said control plate and a second arm portion connected to said blades to rotate said blades about their pivotal connection upon rotation of said head.

5. A rotary wing aircraft according to claim 4, wherein said second universal joint means connects said sleeve member to a stationary portion of said aircraft.

References Cited in the file of this patent

UNITED STATES PATENTS

| | | |
|---|---|---|
| 1,919,089 | Breguet et al. | July 18, 1933 |
| 2,030,578 | Flettner | Feb. 11, 1936 |
| 2,600,097 | Cornillon | June 10, 1952 |
| 2,633,925 | Bates | Apr. 7, 1953 |
| 2,810,443 | Doman | Oct. 22, 1957 |
| 2,957,526 | Derschmidt | Oct. 25, 1960 |
| 3,007,530 | Doman et al. | Nov. 7, 1961 |

FOREIGN PATENTS

| | | |
|---|---|---|
| 263,599 | Great Britain | Jan. 6, 1927 |
| 623,582 | Great Britain | May 19, 1949 |
| 653,402 | Germany | Nov. 23, 1937 |
| 702,159 | Germany | Jan. 31, 1941 |
| 1,015,318 | Germany | Sept. 5, 1957 |